United States Patent
Aoyama

(10) Patent No.: US 7,659,921 B2
(45) Date of Patent: Feb. 9, 2010

(54) DISTANCE MEASUREMENT APPARATUS, DISTANCE MEASUREMENT METHOD, AND DISTANCE MEASUREMENT PROGRAM

(75) Inventor: Chiaki Aoyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 705 days.

(21) Appl. No.: 10/839,560

(22) Filed: May 5, 2004

(65) Prior Publication Data

US 2004/0233280 A1    Nov. 25, 2004

(30) Foreign Application Priority Data

May 19, 2003    (JP) .............................. 2003-139777

(51) Int. Cl.
H04N 9/47   (2006.01)
H04N 7/18   (2006.01)

(52) U.S. Cl. .......................... 348/135; 348/61; 348/806

(58) Field of Classification Search ................. 348/135, 348/180, 806; 356/3, 3.14
See application file for complete search history.

(56) References Cited

U.S. PATENT DOCUMENTS

| | | | |
|---|---|---|---|
| 5,675,380 A * | 10/1997 | Florent et al. ................ 348/251 |
| 5,937,105 A * | 8/1999 | Katayama et al. ........... 382/293 |
| 6,211,911 B1 * | 4/2001 | Komiya et al. ............ 348/218.1 |
| 6,281,931 B1 * | 8/2001 | Tsao et al. .................. 348/247 |
| 6,366,360 B2 * | 4/2002 | Ejiri et al. ..................... 358/1.9 |
| 6,373,518 B1 * | 4/2002 | Sogawa ........................ 348/43 |
| 6,538,691 B1 * | 3/2003 | Macy et al. .............. 348/222.1 |
| 6,728,417 B1 * | 4/2004 | Hara et al. ................... 382/275 |
| 6,801,653 B1 * | 10/2004 | Wu et al. ..................... 382/154 |
| 6,816,187 B1 * | 11/2004 | Iwai et al. .................... 348/187 |
| 6,937,282 B1 * | 8/2005 | Some et al. .................. 348/335 |
| 7,058,235 B2 * | 6/2006 | Wakamoto et al. .......... 382/275 |
| 7,092,015 B1 * | 8/2006 | Sogawa .................... 348/222.1 |
| 7,129,974 B2 * | 10/2006 | Morichika ............. 348/231.99 |
| 7,161,616 B1 * | 1/2007 | Okamoto et al. ............ 348/148 |
| 7,268,803 B1 * | 9/2007 | Murata et al. ............. 348/218.1 |
| 2002/0097906 A1 * | 7/2002 | Ishiyama .................... 382/154 |
| 2002/0113878 A1 * | 8/2002 | Iwai et al. ................... 348/187 |
| 2002/0196423 A1 * | 12/2002 | Shima ....................... 356/3.14 |
| 2003/0004694 A1 * | 1/2003 | Aliaga et al. .................. 703/2 |

(Continued)

FOREIGN PATENT DOCUMENTS

JP    4-200196    7/1992

(Continued)

Primary Examiner—Marsha D Banks Harold
Assistant Examiner—Jessica Roberts
(74) Attorney, Agent, or Firm—Carrier, Blackman & Associatew, P.C.; Joseph P. Carrier; William D. Blackman

(57) ABSTRACT

Captured images taken by cameras are corrected in accordance with characteristics of the lens system of the cameras to produce corrected images. A pixel position detector then obtains the pixel position of the object on each corrected image. With reference to calibration tables, each of which correlates one of a pixel position on a coordinate system of each corrected image and information having a predetermined relation to the pixel position with information specifying a direction and a position of incident light traveling to the pixel position, the direction and the position of the incident light are obtained. Based on the direction and the position of the incident light, the distance to the object OB can be calculated.

10 Claims, 9 Drawing Sheets

U.S. PATENT DOCUMENTS

2004/0207733 A1* 10/2004 Nose et al. ............... 348/222.1
2005/0185049 A1* 8/2005 Iwai et al. .................... 348/47

FOREIGN PATENT DOCUMENTS

| JP | 11-355813 | 12/1999 |
| JP | 2001-109879 | 4/2001 |
| JP | 2002-109518 | 4/2002 |
| JP | 2003-110457 | 4/2003 |

* cited by examiner

BEFORE CORRECTION

90

AFTER CORRECTION

| $ut_R$ | $vt_R$ | $dx_R$ | $dy_R$ | $dz_R$ | $\alpha_1$ | $\gamma$ |
|---|---|---|---|---|---|---|
| 0 | 0 | 0.01 | 0.02 | −0.01 | 58.231 | 24.81 |
| 1 | 0 | 0.009 | 0.02 | −0.01 | 58.22 | 24.81 |
| 3 | 0 | 0.009 | 0.02 | −0.01 | 58.219 | 24.81 |
| . | . | . | . | . | . | . |
| . | . | . | . | . | . | . |
| . | . | . | . | . | . | . |
| 768 | 0 | . | . | . | . | . |
| 0 | 1 | . | . | . | . | . |
| 1 | 1 | . | . | . | . | . |
| . | . | . | . | . | . | . |
| . | . | . | . | . | . | . |

DISTANCE MEASUREMENT APPARATUS, DISTANCE MEASUREMENT METHOD, AND DISTANCE MEASUREMENT PROGRAM

BACKGROUND OF THE INVENTION

1. Field of the Invention

The present invention relates to an apparatus, method, and program for measuring a distance to an object based on images captured by a plurality of cameras.

2. Discussion of Background Art

Generally, when CCD (Charge-Coupled Device) cameras and the like capture an object in a stereoscopic manner to measure the distance from the cameras to the object, various errors affect the measuring accuracy.

One typical example is camera distortion of the lens used for the camera. Camera distortion is an error by which the shape of the captured object suffers from barrel distortion or pincushion distortion. More complicated distortion occurs if the accuracy of the lens is low, and in the case where a resinous or glass protection cover or filter is attached to the camera, the distortion of the protection cover affects as a lens, which then causes distortion on an image captured by the camera.

Once a distortion occurs on the image captured, error is contained in the result of calculations for obtaining the distance to the object.

Camera distortion can be eliminated by the combination of lenses or the provision of the lens aperture. However, correction (calibration) of the captured image can also eliminate the camera distortion.

For example, as disclosed in Japanese Laid-open Patent Application No. 11-355813 (Page 3, FIG. 6, etc.), if camera distortion increases in accordance with distance from the center of the lens (center of the image), the amount of distortion is given by a function in which distance "r" from the center of the lens (center of the image) is considered as a parameter. Therefore, by taking an image of a lattice pattern and measuring at a plurality of points the amount of distortion compared with the actual object, curvature of the lattice on the captured image can be given as a function (approximate expression) of "r". With the use of this function, distortion can be eliminated from captured images.

Even without the use of the approximate expression, as long as storing the corresponding relations between the captured image of the lattice pattern and the actual lattice pattern for each pixel, distortion can be eliminated with the use of this corresponding relations.

In the case where the position of the object is detected (stereo distance measurement) by means of a plurality of cameras, measuring the distance to the object is performed based on each camera position and each pixel corresponding to the object on the image captured by each camera, and also with the principle of triangulation. In the manner of detecting the position of the object using the principle of triangulation, the lens system of each camera has to be a pin-hole camera model basis. As shown in FIG. 7, the pin-hole camera model is a model such that only rays of light (incident light) coming through a base point position (pin-hole H) reach an image plane to associate three-dimensional space (x, y, z) with two-dimensional space (u, v) on the image plane. As described above, the pin-hole camera model considers the case where rays of incident light form a captured image after passing through a single pin-hole.

However, in the camera equipped with a lens system for practical use, rays of incident light do not actually pass through a single pin-hole, which possibly causes a measurement error due to deviation between the model and reality. With respect to an error of the stereo distance measurement, Japanese Laid-open Patent Application No. 11-355813 also discloses a technique to measure the distance after correcting the distortion such as described above. However, such a correction does not adjust errors derived from the pin-hole camera model.

Further, a point taken by a reference camera is projected on a line of an image that is taken by the other camera. Such a line is so called "epipolar line". The epipolar line becomes a curved line due to distortion of the image. In this instance, upon searching a point of the reference camera on an image of the other camera, it is not sufficient to search the point merely on the straight line, so that stereo matching is executed based on characteristics extracted from each image. This requires a large amount of processing. Especially, if these cameras are used as a viewing apparatus with a wide-angle lens and mounted on a robot or vehicle, captured images inevitably contain distortions.

Therefore, the present invention seeks to provide a distance measurement apparatus for measuring the distance to the object on the basis of captured images, which can correct distortion and allow accurate calculations of the distance with a small amount of processing.

SUMMARY OF THE INVENTION

According to the present invention, there is provided a distance measurement apparatus for measuring a distance to an object based on captured images taken by a plurality of cameras. The distance measurement apparatus comprises: a plurality of cameras; a distortion correction executing means which corrects distortion of the captured images according to characteristics of an optical system used for each camera and produces corrected images; a calibration information storage means which stores calibration information; a pixel position detecting means which detects a pixel position of the object on each corrected image; and a distance calculating means which obtains a direction and a position of incident light traveling to the pixel position of the object on each corrected image by referring to the calibration information, and calculates the distance to the object based on the direction and the position of the incident light. The calibration information correlates one of a pixel position on a coordinate system of each corrected image and information having a predetermined relation to the pixel position with information specifying the direction and the position of the incident light traveling to the pixel position.

According to this distance measurement apparatus, the distortion correction executing means eliminates distortion of captured images taken by the plurality of cameras to produce corrected images. Because distortion correction is applied in accordance with distances to the object, distance is required for an accurate correction. According to the present invention, a correction is applied on condition that the distance is determined for one value and that the distortion correction table is prepared based on this distance.

The pixel position detecting means then detects the pixel position of the object from each corrected image, and the distance calculating means refers to the calibration information and obtains the direction and the position of the incident light traveling to the pixel position, so that the distance to the object can be calculated based on this direction and the position. Calculation of the distance is readily achieved by means of the principle of triangulation if the position and the direction of the incident light are specified with reference to a position having a predetermined relation to any one of the cameras.

The calibration information for giving the direction and the position of the incident light is prepared as a table or an approximate expression for each camera by actually and previously measuring the direction of the light traveling to the pixels of the corrected image.

In the aforementioned distance measurement apparatus, the information specifying the direction and the position of the incident light may contain a direction of the incident light and a displacement amount from a reference position to the incident light. Also, the information specifying the direction and the position of the incident light may be coordinates of two points positioned on the incident light.

According to the present invention, there is also provided a method of measuring a distance to an object based on captured images taken by a plurality of cameras and with the use of calibration information, comprising: a distortion correction executing step of correcting distortion of the captured images according to characteristics of an optical system used for each camera and producing corrected images; a pixel position detecting step of detecting a pixel position of the object on each corrected image; and a distance calculating step of obtaining a direction and a position of incident light traveling to the pixel position of the object on each corrected image by referring to the calibration information and calculating the distance to the object from the direction and the position of the incident light. The calibration information correlates one of a pixel position on each corrected image that is prepared by correcting distortion of the captured images taken by the cameras and information having a predetermined relation to the pixel position with information specifying a direction and a position of incident light traveling to the pixel position.

According to the present invention, there is further provided a distance measurement program for measuring a distance to an object based on captured images taken by a plurality of cameras with the use of calibration information, the distance measurement program being configured to cause a computer to operate as: a distortion correction executing means for producing corrected images by correcting distortion of the captured images according to characteristics of an optical system used for each camera; a pixel position detecting means for detecting a pixel position of the object on each corrected image; and a distance calculating means for obtaining a direction and a position of incident light traveling to the pixel position of the object on each corrected image by referring to the calibration information and calculating the distance to the object from the direction and the position of the incident light. The calibration information correlates one of a pixel position on each corrected image that is prepared by correcting distortion of the captured images taken by the cameras and information having a predetermined relation to the pixel position with information specifying a direction and a position of incident light traveling to the pixel position.

BRIEF DESCRIPTION OF THE DRAWINGS

Preferred embodiments of the present invention will be described below, by way of example only, with reference to the accompanying drawings, in which:

FIG. 4 is an example of the calibration table;

DETAILED DESCRIPTION OF THE INVENTION

With reference to the accompanying drawings, a preferred embodiment of the present invention will be described below. At first, description will be given of non-pin-hole characteristics of a camera in the type where rays of incident light do not intersect at one point, which generally results in distortion of images taken by a camera having a lens system. Subsequently, description will be given of calibration data by which characteristics of the non-pin-hole type camera are numerically indicated, and further of a position detection apparatus. A position detection apparatus 1 according to this preferred embodiment corresponds to the distance measurement apparatus defined in the claims. The position detection apparatus 1 can measure the distance of the object as well as the spatial position of the object.

Non-Pin-Hole Characteristics of Camera

Figure 8:
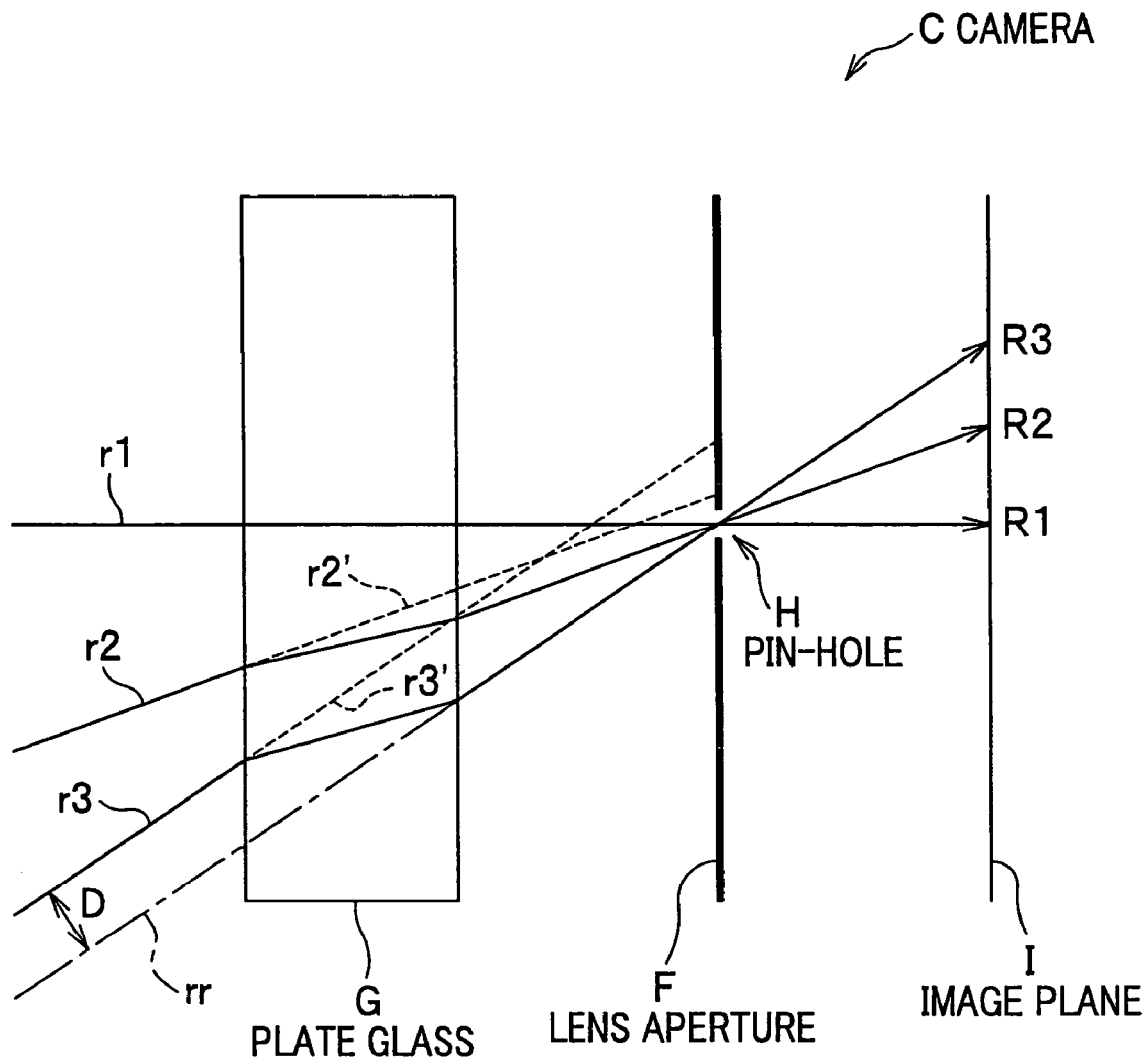
FIG. 8 is a diagram schematically illustrating a camera having a lens system.

With reference to FIG. 8, description will be given of the cause of distortion generally occurring on images captured by a camera having a lens system. FIG. 8 is a diagram schematically illustrating a camera having a lens system. To simplify the explanation, the lens system is shown as a plate glass G and a pin-hole H is formed by a lens aperture F. The ray of incident light r1, which perpendicularly penetrates the plate glass G of the camera C, forms an image on a pixel R1 of an image plane I through the pin-hole H. Rays of incident light r2 and r3, which diagonally penetrate the plate glass G, respectively form an image on a pixel R2, R3 of the image plane I through the pin-hole H after refraction within the plate glass G.

It is however noted that the camera C is not a pin-hole camera model because extension lines r2' and r3' of the rays of incident light r2 and r3, which have not passed through the plate glass G, do not intersect with the ray of incident light r1 at one point. For this reason, the ray of incident light r3, which is offset by a distance D from the ray of incident light rr that is expected in the pin-hole camera model, forms an image on a pixel R3 of the image plane I.

As described above, cameras which form an image by means of incident light penetrating a lens system (plate glass G in this example) lack the pin-hole characteristics (non-pin-hole characteristics) A camera having a lens system is hereinafter referred to as a "non-pin-hole camera".

Calibration Data

Figure 9:
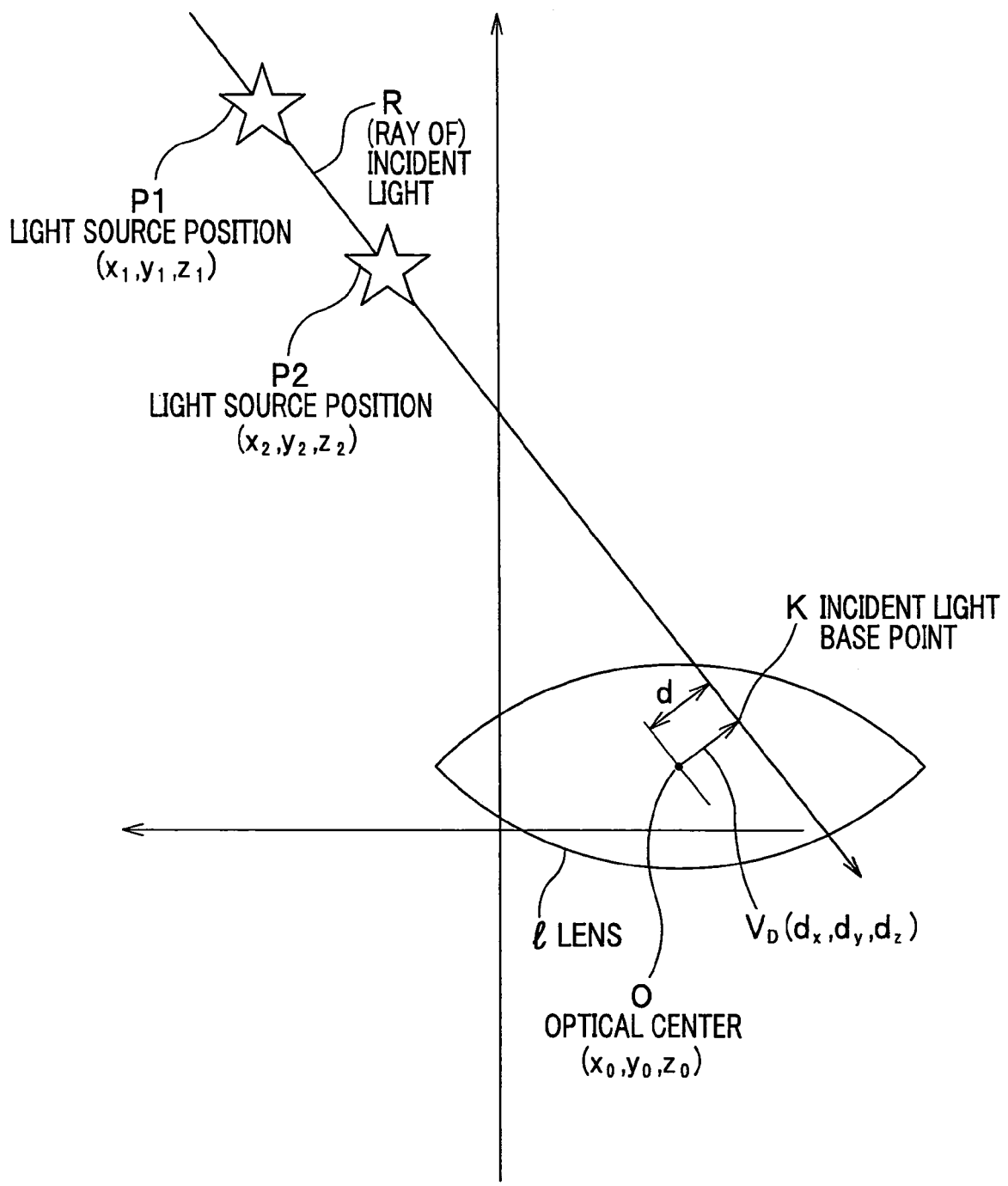
FIG. 9 is a diagram explaining the substance of the calibration data.

With reference to FIG. 9, description will be given of calibration data by which characteristics of the non-pin-hole camera are numerically indicated. As shown in FIG. 9, the ray of incident light R traveling to the lens 1 is defined by two points. If lights emitted from a first light source P1 and a second light source P2 form an image on the same pixel (u, v) (not shown), the ray of incident light R is identified as the (ray of) incident light corresponding to the pixel.

Herein, a point where the sum of squares of distances to all the rays of incident light takes the minimum value is defined as an optical center O, whereas a point where the distance between the ray of incident light R corresponding to each pixel and the optical center O takes the minimum value is defined as a base point K of the ray of incident light R.

To be more specific, the optical center $O(x_0,y_0,z_0)$ is obtained by least-squares method as a position such that the sum of squares of the distance d from the ray of incident light R defined by the light source position $P1(x_1,y_1,z_1)$ and the light source position $P2(x_2,y_2,z_2)$ takes the minimum value. The sum of squares of the distance d is given by the following expression (1).

$$d^2 = -(A^2/B) + C \qquad (1)$$

where A, B, and C are defined as:

$$A = (x_2-x_1)(x_1-x_0) + (y_2-y_1)(y_1-y_0) + (z_2-z_1)(z_1-z_0)$$

$$B = (x_2-x_1)^2 + (y_2-y_1)^2 + (z_2-z_1)^2$$

$$C = (x_1-x_0)^2 + (y_1-y_0)^2 + (z_{1-z0})^2$$

As described above, the characteristics of the non-pin-hole camera can be numerically indicated by the calibration data that is the data correlating for each pixel position the direction defined by the light source positions P1 and P2 with the displacement amount (three-dimensional vector $V_D(d_x,d_y,d_z)$) from the optical center O to the base point K.

It is to be noted that the calibration data is not limited to this specific example. In the above example, the optical center O is referred to as the reference position, and a vector directing from the optical center O to the intersection point between the perpendicular line from the optical center O and the (ray of) incident light is indicated as the displacement amount $V_{DR}$. However, as long as being a fixed point having a predetermined relation with the camera, the reference position may be any points other than the optical center O. Further, the displacement amount $V_{DR}$ is not limited to the vector directing from the reference position to the intersection point, and it may be any vector directing from the reference position to any one arbitrary point on the (ray of) incident light.

Configuration of Position Detection Apparatus (Distance Measurement Apparatus) 1

Figure 1:
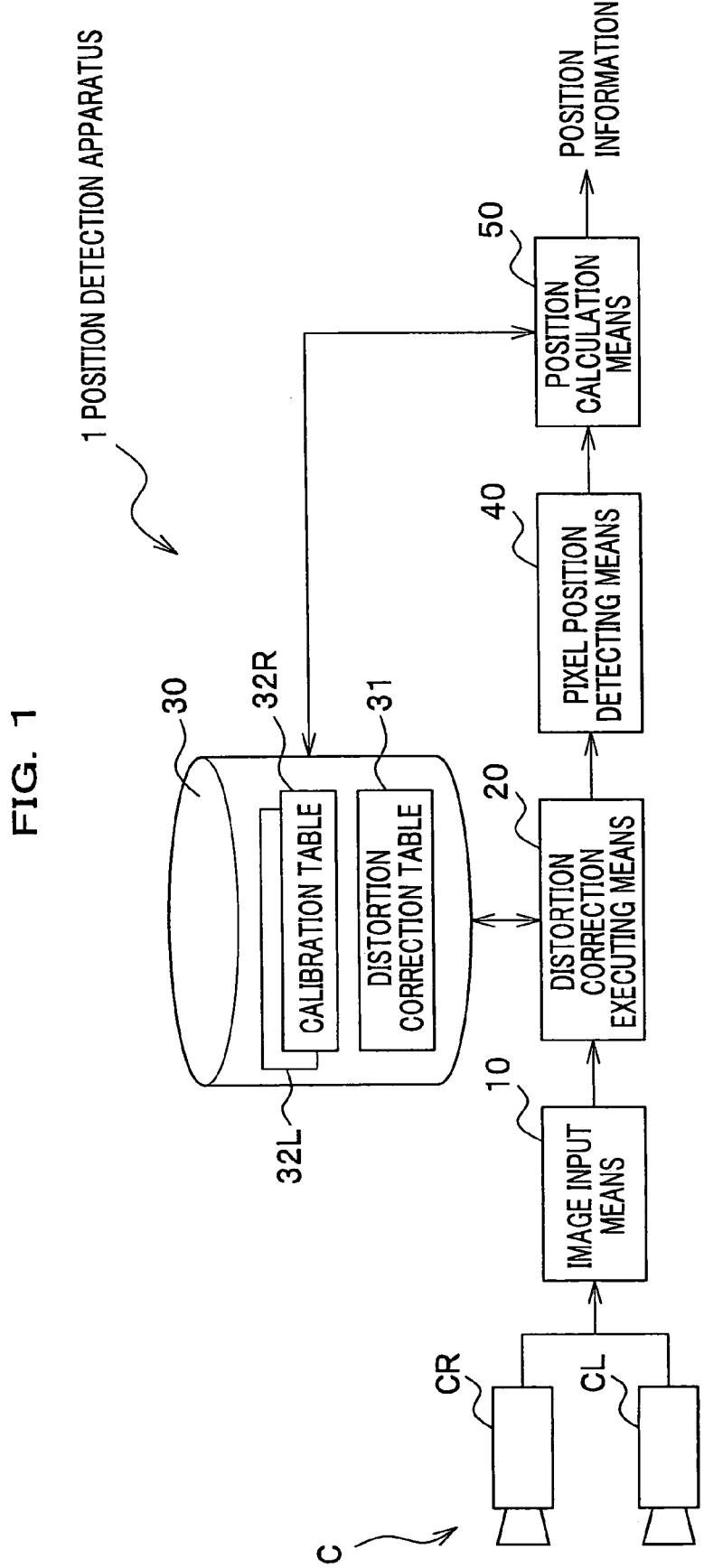
FIG. 1 is a block diagram of a position detection apparatus according to a preferred embodiment of the present invention.

As shown in FIG. 1, the position detection apparatus 1 includes cameras C, an image input means 10, a distortion correction executing means 20, a storage device 30, a pixel position detecting means 40, and a position calculation means (distance calculating means) 50.

The cameras C consists of a right camera CR and a left camera CL which are arranged inline. Each of the cameras CR, CL is equipped with an optical system including a lens as well as CCD elements so that the external view is formed as an image on the CCD elements through the lens. The obtained image data is then inputted to the image input means 10.

The position detection apparatus 1 according to this preferred embodiment employs two cameras CR, CL. However, three or more cameras may be arranged parallel. Also, the cameras CR, CL may be arranged such that the axes of lenses thereof are not parallel. For example, the axes of lenses may be converged to one point.

The image input means 10 digitalizes image signals outputted from the cameras C and then imports the digitalized signals.

The distortion correction executing means 20 receives data for each of the right and left captured images from the image input means 10, and corrects distortion of the captured images by referring to the distortion correction table 31 to be described later. The distortion correction executing means 20 produces a right corrected image and a left corrected image respectively from the captured images taken by the right camera CR and the left camera CL.

The storage device 30 is a storage device such as a hard disk, and is used as a database required for the position detection apparatus 1, a storage device for images under processing, or a work area. The storage device 30 corresponds to the calibration information storage means. The storage device 30 stores therein a distortion correction table 31 for eliminating distortion of the images taken by the cameras CR, CL, and calibration tables 32R, 32L used for calculating the distance to the object.

The distortion correction table 31 is a table for eliminating distortion of the images taken by the cameras CR, CL. One example for preparing the distortion correction table 31 will be briefly described below.

Figure 2:
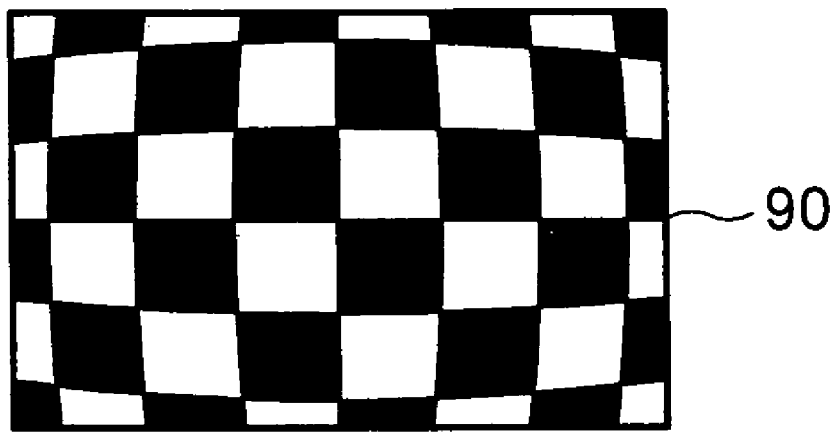
FIG. 2 shows a captured image which contains distortion and an image after correction.
Figure 2:
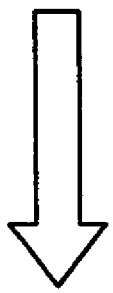
Figure 2:
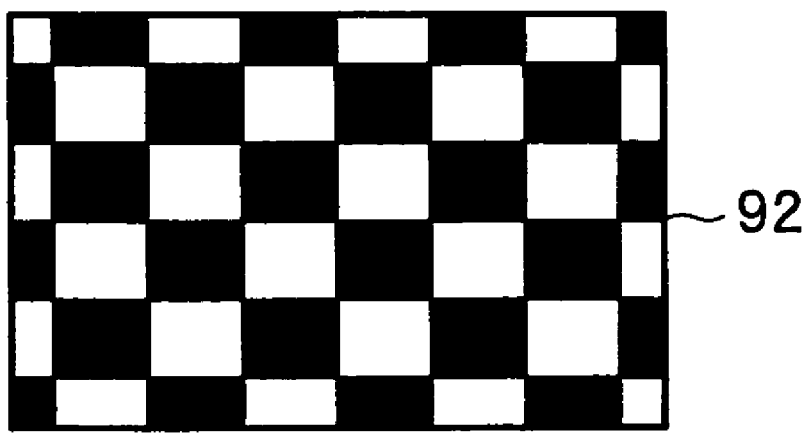

As shown in FIG. 2, if the cameras CR, CL take an image of a checkered pattern that is depicted on a flat plane from the front side, barrel distortion occurs as illustrated in the before-correction figure positioned upside. In order to conform to the number of pixels of the vertical and horizontal checks positioned at the center of the image where distortion can be ignored, the whole lattice points on the image are moved to produce the after-correction image positioned downside. Subsequently, the movement amount (relative coordinates) of the lattice points is shown in a table having correlations with the pixel positions of the before-correction image. Linear interpolation is applied to each pixel between the lattice points. The distortion correction table 31 is thereby prepared. The distortion correction table 31 allows an accurate correction at the distance, by which the checkered pattern is taken by the cameras for the preparation of the table. On the contrary, if the image capture distance is different, the completely accurate correction is not achieved. However, because the epipolar line in right and left directions is substantially in the form of a straight line, it is possible to search on the straight line by means of stereo matching.

The distortion correction executing means 20 then obtains the movement amount for each pixel position from the distortion correction table 31, and corrects distortion by moving the pixels of the captured image.

Manner of correcting distortion is not limited to this method using such a distortion correction table, and any other known methods can be applied.

The calibration table 32R is a table correlating each pixel position of the corrected image with the direction of the (ray of) incident light traveling to the pixel position and the displacement amount from the reference position to the (ray of) incident light. The calibration table 32R corresponds to the calibration information defined in the claims.

Figure 3:
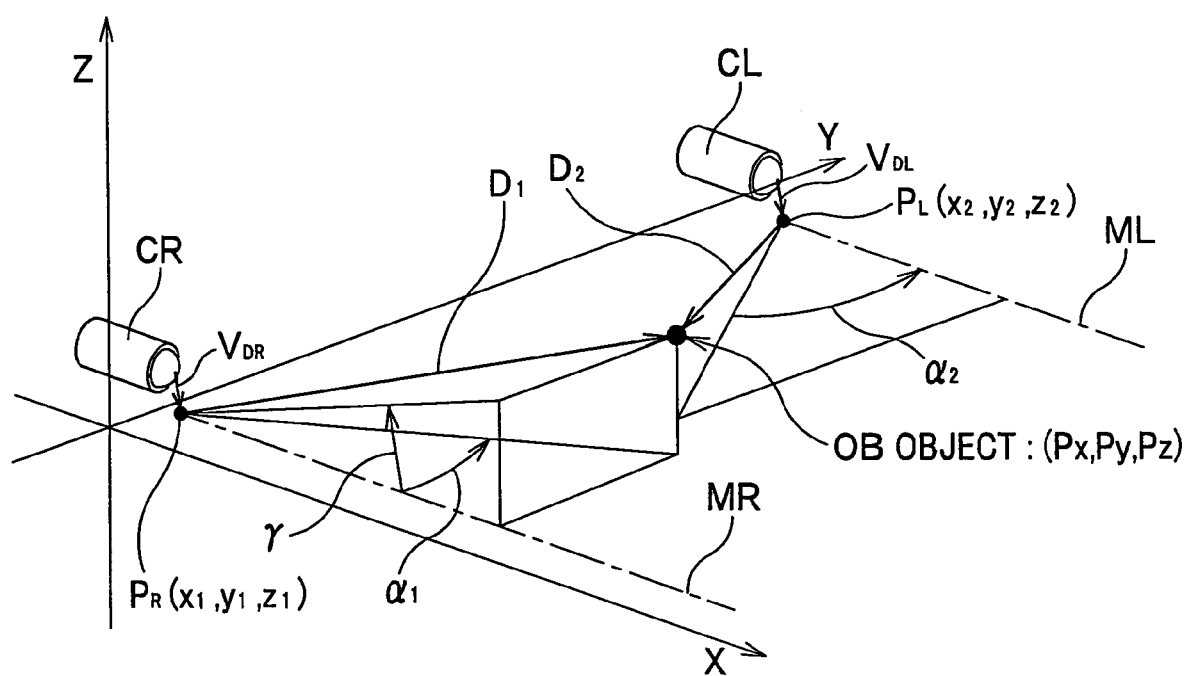
FIG. 3 shows the coordinate system for calculating the position of the object.

As best seen in FIG. 3, the object OB is defined by the angles $\alpha_1$, $\alpha_2$, $\gamma$ with the position of the camera CR being referred to as the reference position (Px, Py, Pz). Herein, $\alpha_1$, $\alpha_2$, $\gamma$ are defined as:

$\alpha_1$: horizontal angle of the vector $D_1$ directing from the camera base point $P_R$ of the camera CR to the object OB relative to the axis of lens MR of the camera CR.

$\gamma$: vertical angle of the vector $D_1$ directing from the camera base point $P_R$ of the camera CR to the object OB relative to the axis of lens MR of the camera CR.

$\alpha_2$: horizontal angle of the vector $D_2$ directing from the camera base point $P_L$ of the camera CL to the object OB relative to the axis of lens ML of the camera CL.

The camera base points $P_R$, $P_L$ correspond to the base point K of the ray of incident light described for measurement of the calibration data.

An example of the calibration table 32R is shown in FIG. 4, in which the space coordinates have been set as above. FIG. 4 is an example of the calibration table used for the corrected image that is produced from the image taken by the right camera CR. As seen in FIG. 4, the calibration table 32R correlates the coordinate ($ut_R$, $v_{tR}$) on the corrected image with the displacement amount $V_{DR}$ ($dx_R$, $dy_R$, $dz_R$) and the angles $\alpha_1$, $\gamma$. The angles $\alpha_1$, $\gamma$ are information specifying the direction of incident light as defined in the claims, and the displacement amount $V_{DR}$ ($dx_R$, $dy_R$, $dz_R$) is information specifying the position of incident light as defined in the claims. The displacement amount $V_{DR}$ ($dx_R$, $dy_R$, $dz_R$) represents the amount of displacement from the optical center O to the camera base point $P_R$ as a vector.

The reason for being referred to as the "calibration" table 32R throughout the specification is because it can become information for calibrating the non-pin-hole characteristics of the cameras C.

The calibration table 32R can be prepared as follows. Firstly, based on the actual measurement of the calibration data, the relation between the coordinate ($u_R$, $v_R$) on the captured image and the calibration data (the direction (angle $\alpha_1$, angle $\gamma$) and the displacement amount $V_{DR}$ ($dx_R$, $dy_R$, $dz_R$) of the ray of light traveling to the coordinate ($u_R$, $v_R$)) is obtained. Subsequently, the coordinate ($u_R$, $v_R$) is converted into the coordinate ($ut_R$, $vt_R$) by means of the distortion correction table 31, thereby obtaining the relations among the coordinate ($ut_R$, $vt_R$), the displacement amount $V_{DR}$ ($dx_R$, $dy_R$, $dz_R$), and the angles $\alpha_1$, $\gamma$.

In this preferred embodiment, the coordinate ($ut_R$, $vt_R$) on the corrected image and the calibration data are correlated to each other by the calibration table 32R. However, values having a predetermined relation, i.e. mutually convertible relation, to ($ut_R$, $vt_R$) may be correlated with the calibration data.

Because the calibration table 32R relies on characteristics of the lens system of the camera C, it is necessary to provide a calibration table for each camera (for the right corrected image and the left corrected image). However, if the right and left cameras CR, CL are of the same type, the common calibration table 32R may be used for both cameras CR, CL. In this instance, however, the plus-minus conversion of the angle may be required in accordance with the angle setting.

As is the case with the calibration table 32R for the right corrected image, the relation between the displacement amount $V_{DL}$ ($dx_L$, $dy_L$, $dz_L$) and the angle $\alpha_2$ is registered on the calibration table 32L (not shown) for the left corrected image.

The pixel position detecting means 40 detects from the corrected image the coordinate position (ut, vt) (pixel position) of the object on the image. Detection of the pixel position may be carried out by any known methods in accordance with the object OB. For example, if the object is a light source consisting of one point or a mark indicated by a strong contrast, a pixel with lightness or contrast having a certain or more threshold value may be detected from the corrected image, so that the detected pixel is regarded as the object. If the object is a monochromatic ball, the corresponding color group is detected and the position of the center of gravity of this color group may be regarded as the position of the object OB. Further, if a human is the object, an area with motion can be determined as the human to thereby specify the human, and a certain part within the area of the human, such as a head top, may be regarded as the object OB.

Detection of the pixel position is carried out for at least one corrected image, such as the right corrected image, among a plurality of corrected images corresponding to the number of the cameras C (a first pixel position detecting means). Subsequently, the object is searched on other images, such as the left corrected image, and on the corresponding epipolar line (a second pixel position detecting means).

Figure 5A:
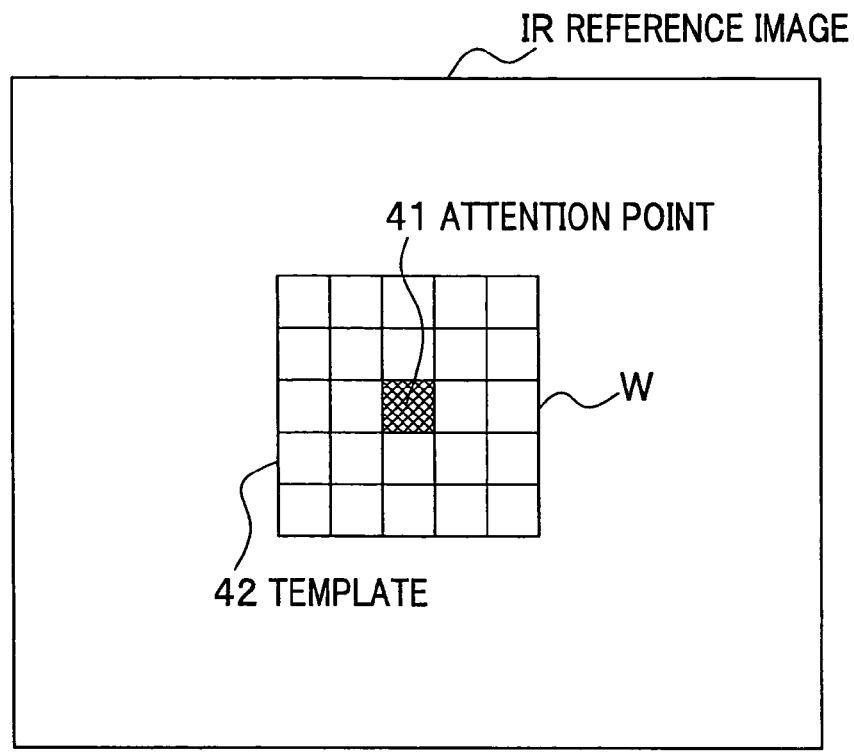
FIGS. 5A and 5B explain Area-based matching process.
Figure 5B:
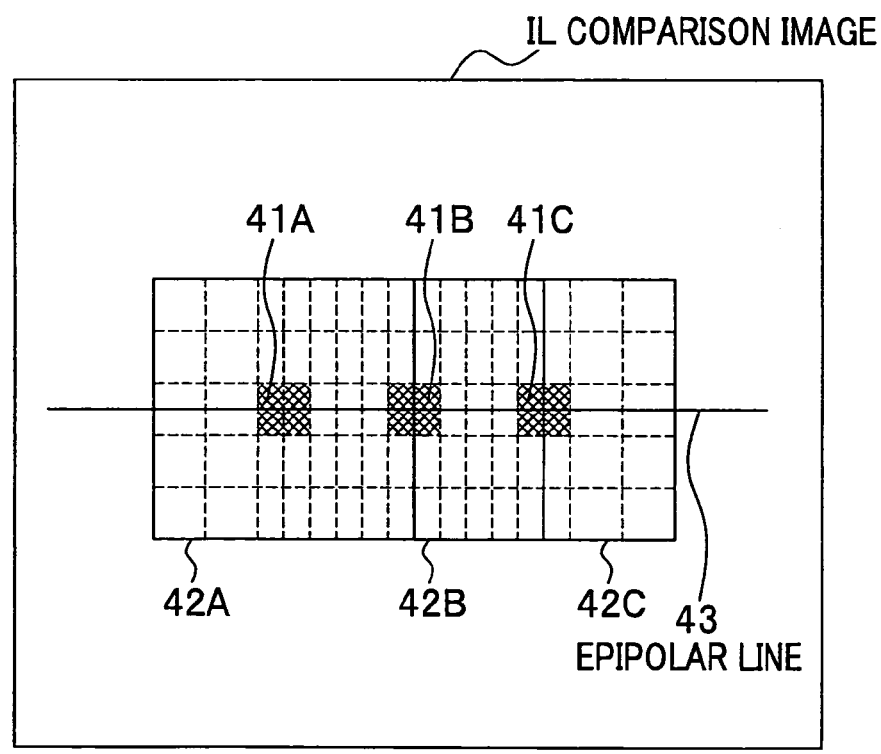

For example, as disclosed in Japanese Laid-open Patent Application No. 2001-109879, the search is achieved by Area-based matching method. Explanation of Area-based matching will be given on the preferred embodiment of the present invention. As shown in FIG. 5A, of the reference image (right corrected image) IR taken by the right camera CR, local windows (area) W are set around an attention point (attention image) 41 that is arbitrarily set, thereby obtaining a template 42. In the example shown in FIG. 5A, the template 42 consists of 5×5 elements. Subsequently, as shown in FIG. 5B, the template 42 is arranged as a template 42A on the epipolar line 43 of the comparison image (left corrected image) IL. Within the search area set as above, the matching is carried out to calculate the coincidence R ($ut_L$, $vt_L$) in accordance with the following expression (2).

$$R(ut_L, vt_L) = \sum_{(ut_L, vt_L) \in W} (Im1(ut_L, vt_L) - Im2(ut_L + \Delta ut_L, vt_L + \Delta vt_L))^2 \quad (2)$$

Next, the template 42 is shifted along the epipolar line 43 and arranged as the template 42B. As is the case with the template 42A, the coincidence R ($ut_L$, $vt_L$) is calculated in accordance with the expression (2). Further, the template 42 is shifted along the epipolar line 43 and arranged as a template 42C. As is the case with the template 42A and the template 42B, the coincidence R ($ut_L$, $vt_L$) is calculated in accordance with the expression (2). In the expression (2), $Im1(ut_L, vt_L)$ represents pixels on the reference image IR, and $Im2$ ($ut_L + \Delta ut_L$, $vt_L + \Delta Vt_L$) represents pixels on the comparison image IL. $\Delta ut_L$ and $\Delta vt_L$ represent the displacement amount of the template 42 along the epipolar line 43. When the value of the coincidence R ($ut_L$, $vt_L$) becomes the smallest of the three coincidences R ($ut_L$, $vt_L$) obtained with the above expression (2), the coincidence R (similarity) between the reference image IR and the comparison image IL becomes the highest of all. Such a point is determined as a pixel position (pixel position of the object OB) corresponding to the attention point 41 on the reference image IR.

The position calculation means 50 calculates the spatial position of the object OB based on the pixel position of the object OB that is obtained by the pixel position detecting means 40.

The position calculation means 50 refers to the calibration table 32R with the pixel position ($ut_R$, $vt_R$) of the object OB on the right corrected image as a key, and obtains the displacement amount $V_{DR}$ ($dx_R$, $dy_R$, $dz_R$) and the angles $\alpha_1$ and $\gamma$. In a similar manner, the position calculation means 50 refers to the calibration table 32L with the pixel position ($ut_L$, $vt_L$) of the object OB on the left image as a key, and obtains the displacement amount $V_{DL}$ ($dx_L$, $dy_L$, $dz_L$) and the angle $\alpha_2$.

The coordinate of the camera base point $P_R(x_1, y_1, z_1)$ for the right camera CR is obtained from the displacement amount $V_{DR}$ ($dx_R$, $dy_R$, $dz_R$), and the coordinate of the camera base point $P_L(x_2, y_2, z_2)$ for the left camera CL is obtained.

As seen in FIG. 3, from geometrical relations the position of the object OB is given by the following expressions (3) to (5).

$$Px = (x_1 \tan \alpha_1 - y_1 - x_2 \tan \alpha_2 + y_2)/(\tan \alpha_1 + \tan \alpha_2) \quad (3)$$

$$Py = (P_x - x_1)\tan\alpha_1 + y_1 \quad (4)$$

$$Pz = (Px - x_1)\tan\gamma + z_1 \quad (5)$$

The two vectors $D_1$ and $D_2$ may not actually intersect with each other within the three-dimensional space because of errors. In the above expressions, the intersection point in the X-Y plane and the Z-coordinate value of the vector $D_1$ corresponding to the intersection point may be regarded as the intersection point position. Alternatively, the Z-coordinate value of the intersection point between the vectors $D_1$ and $D_2$ may be averaged.

Each of the aforementioned means 10 to 50 may be configured as a program to cause a computer to operate the corresponding function.

Operation of Position Detection Apparatus 1

Figure 6:
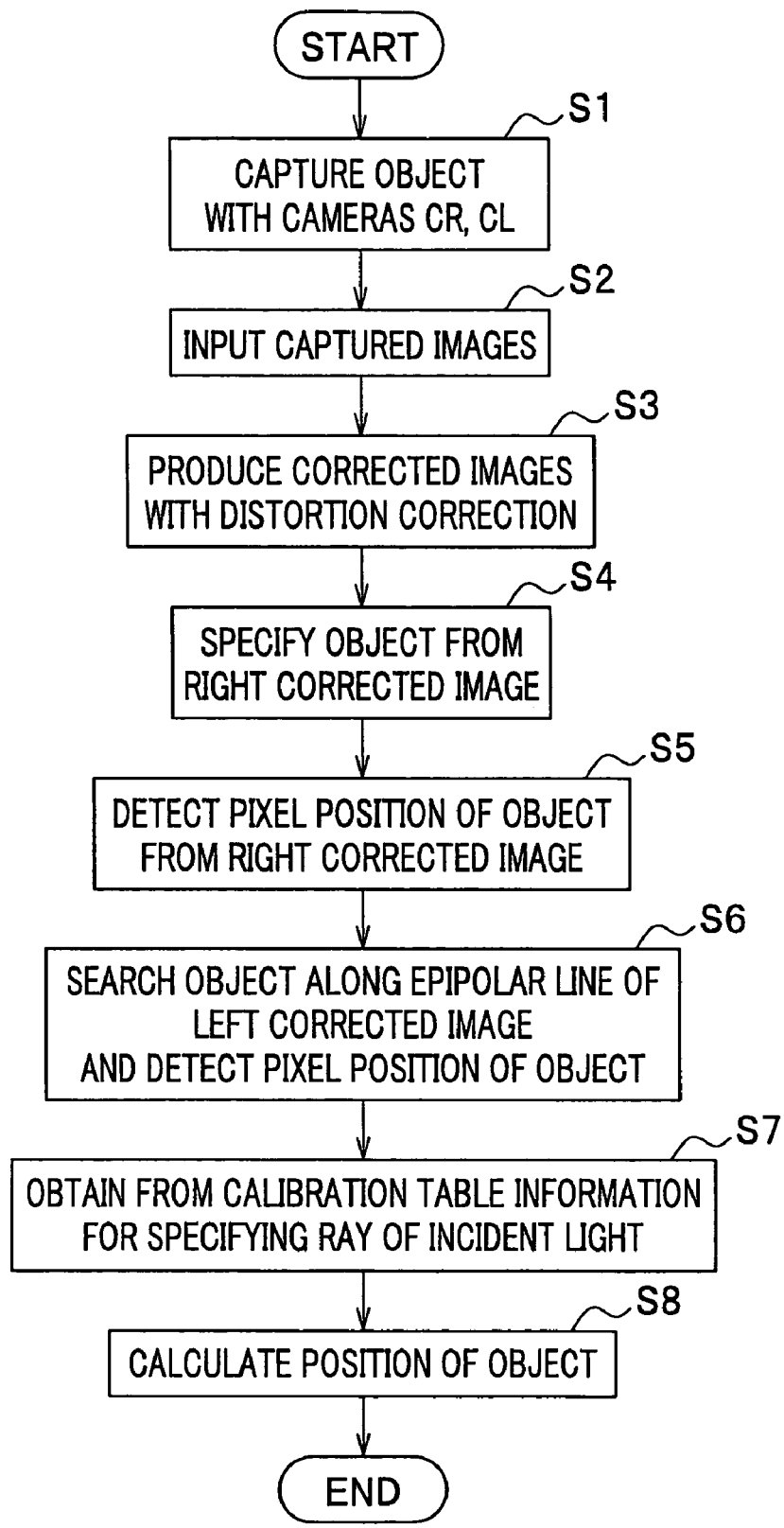
FIG. 6 is a flow chart showing operation of the position detection apparatus.
Figure 7:
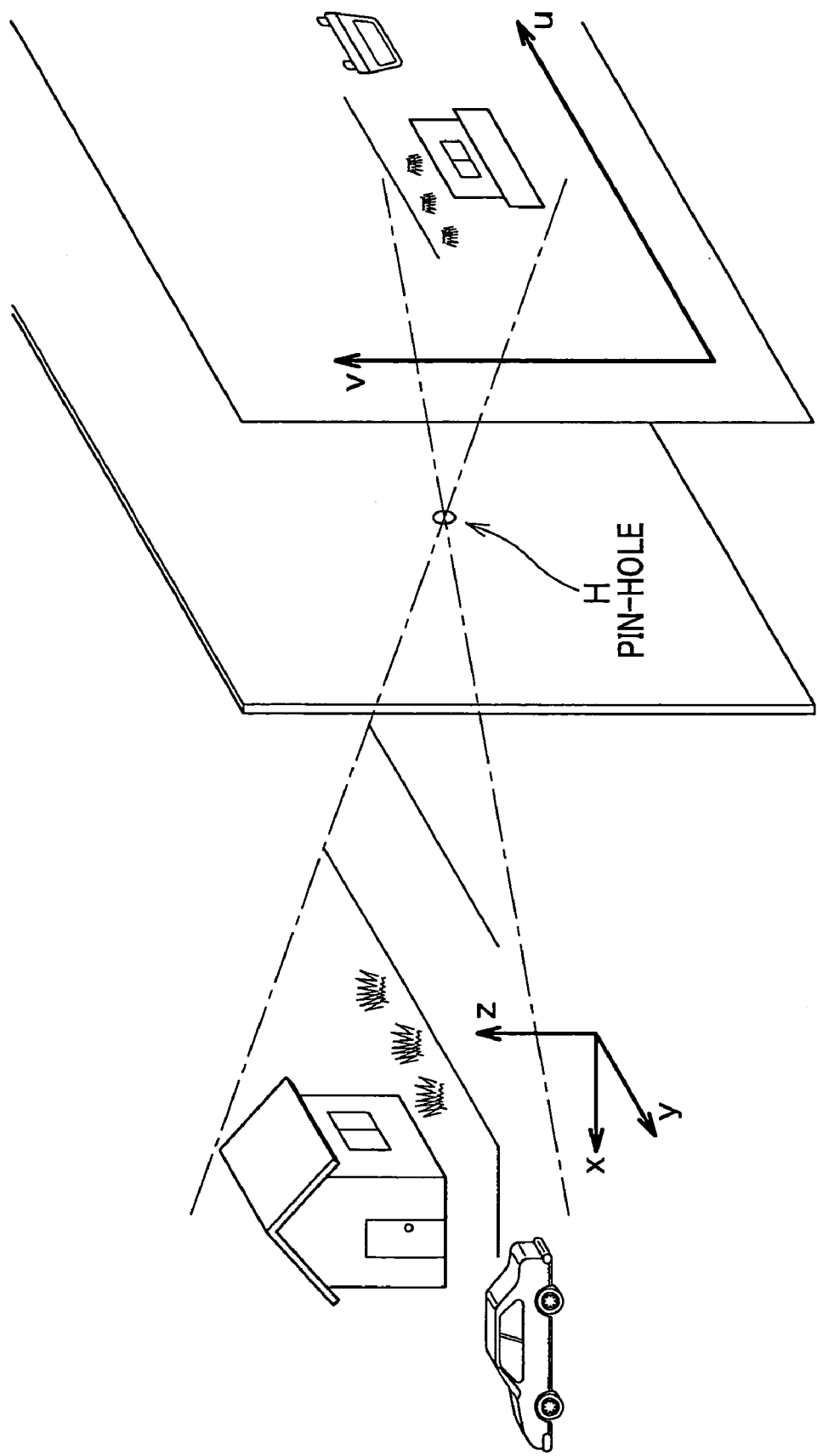
FIG. 7 is a conceptual diagram illustrating a pin-hole camera model.

Operation of the position detection apparatus 1 will be described below with reference to FIG. 6. FIG. 6 is a flow chart showing the manner of detecting the object position by the position detection apparatus 1.

The position detection apparatus 1 takes images of the object OB with the cameras CR, CL to obtain the right captured image and the left captured image, respectively (step S1). The image input means 10 then inputs these images as digital images (step S2). The distortion correction executing means 20 refers to the distortion correction table 31 of the storage device 30, and corrects distortion of the image to produce the right corrected image and the left corrected image respectively from the right captured image and the left captured image (step S3: distortion correction executing step). In the right and left corrected images produced by this correction, each of the epipolar lines is substantially in the form of a straight line.

Next, the object OB is specified from the right corrected image (step S4). To specify the object OB, an appropriate method is adopted in accordance with the object OB. For example, if the object OB is marked with a certain colored circular mark on a white background, the object OB is specified on the image by finding out the certain color by means of image processing. Subsequently, the pixel position, i.e., the coordinate on the image, of the object OB on the right corrected image is detected (step S5). This can be achieved, for example, by detecting the coordinate of the center of the mark as the pixel position of the object OB or by known SAD (Sum of Absolute Difference) method.

Next, the position detection apparatus 1 searches the object OB on the epipolar line of the left corrected image that corresponds to the pixel position of the object OB on the right corrected image, so as to detect the pixel position (step S6). In other words, on the epopolar line on the left corrected image that is corresponding to the attention point of the right corrected image, the coincidence R ($ut_L$, $vt_L$) is calculated at predetermined intervals. The pixel at which the coincidence R ($ut_L$, $vt_L$) takes the minimum value is determined as the pixel position of the object OB. In this instance, because the position detection apparatus 1 searches the object OB on the left corrected image merely along one line, less processing is required for the stereo matching. Herein, the step S4 through step S6 are corresponding to the pixel position detecting step defined in the claims.

The position detection apparatus 1 then refers to the calibration tables 32R, 32L with the respective pixel positions of the object OB on the right and left corrected images as a key, and obtains information for specifying the position and the direction of the ray of incident light traveling to the pixel position (step S7). As to the right camera CR (right corrected image), the information contains the displacement amount $V_{DR}$ ($dx_R$, $dy_R$, $dz_R$) for specifying the camera base point $P_R$ and the angles $\alpha_1$ and $\gamma$. As to the left camera CL (left corrected image), the information contains the displacement amount $V_{DL}$ ($dx_L$, $dy_L$, $dz_L$) for specifying the camera base point $P_L$ and the angle $\alpha_2$.

Subsequently, the position (Px, Py, Pz) of the object OB is calculated with the above expressions (2) to (4) (step S8). By calculating the position of the object OB as described above, Px represents the distance from the right camera CR to the object OB. The step S7 and the step S8 are corresponding to the distance calculating step defined in the claims.

As described previously, according to the position detection apparatus 1, the accurate position and distance of the object OB can be calculated in consideration of the non-pin-hole characteristics of the camera C. Further, because the stereo matching is carried out after correcting distortion of the images taken by the cameras C, the position of the object OB and the distance to the object OB can be calculated with less processing.

While the present invention has been described in detail with reference to specific embodiments thereof, it will be apparent to one skilled in the art that various changes and modifications may be made without departing from the scope of the claims. For example, calculation of the distance is not limited to the method as described above, by which the three-dimensional position of the object OB is accurately defined. Alternatively, the difference (parallax) and the distance of the horizontal pixel position between the right and left corrected images at the time of applying the stereo matching may be stored in a related manner, so that the parallax is obtained for the object OB to be captured, thereby calculating the distance from the parallax.

Although the calibration tables 32R, 32L are used as calibration information in the above preferred embodiment, it is possible to correlate the pixel position of the corrected image with the position and the direction of the ray of incident light by means of an approximate expression.

What is claimed is:

1. A method of measuring a distance to an object based on captured images taken by a plurality of non-pin-hole cameras and with the use of calibration information, which correlates first information of a pixel position of each pixel on a coordinate system of each corrected image that is prepared by correcting distortion of the captured images taken by the cameras with second information specifying a direction of incident light traveling to the pixel position and a displacement of the incident light due to a non-pin-hole camera, the method comprising:

capturing images of an object using a plurality of non-pin-hole cameras;

a distortion correction executing step for correcting distortion of the captured images according to characteristics of an optical system used for each camera and producing corrected images;

a pixel position detecting step for detecting a pixel position of the object on each corrected image;

a calibrating step for calibrating a reference point of each of the non-pin-hole cameras toward a pin-hole-camera model based on the detected pixel position and the calibration information; and a distance calculating step for and calculating the distance to the object based on the detected pixel position and the calibrated reference point through the pin-hole-camera model, wherein the pixel position detecting step involves initially detecting a pixel position of the object on one corrected image and then conducting stereo matching between the corrected images along an epipolar line on another one of the corrected images defined by the pixel position of the object initially detected on the one corrected image to search a pixel position of the object on the other one of corrected images, the epipolar line being made a substantially straight line on the corrected images by correction by the distortion correction executing step to suppress an amount of processing in the stereo matching, resulting in decrease in a processing amount of stereo matching; and the distance calculating step involves obtaining directions and positions of the incident light traveling to the pixel positions of the object from the pixel positions of the object on the corrected images from the pixel position detecting step based on the calibration information and calculating the distance to the object from the obtained directions and positions of the incident light through the pin-hole-camera model.

2. A distance measurement method according to claim 1, wherein the second information further specifies a displacement amount from a reference position to the incident light.

3. A distance measurement method according to claim 1, wherein the second information further specifies coordinates of two points positioned on the incident light.

4. A method of measuring a distance to an object according to claim 1, wherein said calibration information comprises a distortion correction table having pixel positions for each of the captured images and the corresponding corrected images.

5. A method of measuring a distance to an object according to claim 4, wherein each of said pixel positions of the corrected images is calculated by applying a linear interpolation technique to each pixel between lattice points.

6. A distance measurement apparatus for measuring a distance to an object based on captured images, comprising:

a plurality of non-pin-hole cameras for capturing images of an object;

a distortion correction executing means for correcting distortion of the captured images according to characteristics of an optical system used for each camera and producing corrected images;

a calibration information storage means for storing calibration information correlating first information of a pixel position of each pixel on a coordinate system of each corrected image with second information specifying a direction of incident light traveling to the pixel position and a displacement of the incident light due to a non-pin-hole camera;

a first pixel position detecting means for detecting a pixel position of the object on one of corrected images;

a second pixel position detecting means for conducting stereo matching between the corrected images along an epipolar line on the other one of the corrected images defined by the pixel position detected by the first pixel position to search a pixel position of the object on the other one of corrected images, the epipolar line being made a substantially straight line on the corrected images by correction by the distortion correction executing means to suppress an amount of processing in the stereo matching, resulting in decrease in a processing amount of stereo matching; and a distance calculating means for obtaining directions and positions of the incident light traveling to the pixel positions of the object from the pixel positions of the object on the corrected images from the first and second pixel position detecting means based on the calibration information and calculating the distance to the object from the obtained directions and positions of the incident light through a pin-hole-camera model.

7. A distance measurement apparatus according to claim 6, wherein the second information further specifies a displacement amount from a reference position to the incident light.

8. A distance measurement apparatus according to claim 6, wherein the second information further specifies coordinates of two points positioned on the incident light.

9. A distance measurement apparatus according to claim 6, wherein said calibration information storage means comprises a distortion correction table having pixel positions for each of the captured images and the corresponding corrected images.

10. A distance measurement apparatus according to claim 9, wherein each of said pixel positions of the corrected images is calculated by applying a linear interpolation technique to each pixel between lattice points.

* * * * *